United States Patent
Giralt et al.

(10) Patent No.: US 12,539,288 B2
(45) Date of Patent: Feb. 3, 2026

(54) COMPOSITIONS AND METHODS USING AT LEAST ONE GLYCINE OR DERIVATIVE THEREOF AND/OR AT LEAST ONE N-ACETYLCYSTEINE OR DERIVATIVE THEREOF, AND AT LEAST ONE THYMOL AND/OR CARVACROL

(71) Applicant: SOCIETE DES PRODUITS NESTLE S.A., Vevey (CH)

(72) Inventors: Albert Giralt, Lausanne (CH); Marine Kraus, Vuarrens (CH); Philipp Gut, Geneva (CH); Giulia Lizzo, Echandens (CH); Gabriele Civiletto, Lausanne (CH); Leonidas Georgios Karagounis, Vaud (CH)

(73) Assignee: Societe des Produits Nestle S.A., Vevey (CH)

( * ) Notice: Subject to any disclaimer, the term of this patent is extended or adjusted under 35 U.S.C. 154(b) by 298 days.

(21) Appl. No.: 18/257,660

(22) PCT Filed: Dec. 13, 2021

(86) PCT No.: PCT/EP2021/085403
§ 371 (c)(1),
(2) Date: Jun. 15, 2023

(87) PCT Pub. No.: WO2022/128870
PCT Pub. Date: Jun. 23, 2022

(65) Prior Publication Data
US 2025/0281438 A1    Sep. 11, 2025

(30) Foreign Application Priority Data

Dec. 18, 2020   (EP) .................... 20215292

(51) Int. Cl.
  *A61K 31/198*  (2006.01)
  *A61K 31/05*   (2006.01)
  *A61K 45/06*   (2006.01)
  *A61P 1/16*    (2006.01)

(52) U.S. Cl.
  CPC .......... *A61K 31/198* (2013.01); *A61K 31/05* (2013.01); *A61K 45/06* (2013.01); *A61P 1/16* (2018.01)

(58) Field of Classification Search
  CPC .......... A61K 31/198; A61K 31/05; A61P 1/16
  USPC ................................. 514/561, 562
  See application file for complete search history.

(56) References Cited

U.S. PATENT DOCUMENTS

2011/0077303 A1   3/2011   Sekhar
2011/0281956 A1   11/2011  Park

FOREIGN PATENT DOCUMENTS

| CN | 101932238 A | 12/2010 |
|----|-------------|---------|
| CN | 105377246 A | 3/2016  |
| WO | 2016191468  | 12/2016 |
| WO | 2018117954  | 6/2018  |
| WO | 2020064946  | 4/2020  |

OTHER PUBLICATIONS

Saravanan et al. "Role of thymol on hyperglycemia and hyperlipidemia in high fat diet-induced type 2 diabetic C57BL/6J mice" European Journal of Pharmacology, 2015, vol. 761, pp. 279-287.
Kim et al. "Carvacrol Protects against Hepatic Steatosis in Mice Fed a High-Fat Diet by Enhancing SIRT1-AMPK Signaling" Hindawi Publishing Corporation Evidence Based Complementary and Alternative Medicine, Jan. 1, 2013, vol. 2013, Article ID 290104, 10 pages.
Kang et al. "Inhibitory Effects of Thymol Isolated from *Curcuma longa* L. on Adipogenesis in HepG2 Cells" Processes, 2020, vol. 8, No. 9, 10 pages.
Chinese Office Action for Appl No. 202180083558.9 dated Oct. 24, 2025, 6 pages.
Dludla et al., "N-Acetyl Cysteine Targets Hepatic Lipid Accumulation to Curb Oxidative Stress and Inflammation in Nafld: A Comprehensive Analysis of the Literature", Antioxidants, vol. 09, 2020, pp. 1-20.
Saravanan et al., "Role of Thymol on Hyperglycemia and Hyperlipidemia in High Fat Diet-induced Type 2 Diabetic C57BL/6J Mice", European Journal of Pharmacology, vol. 761, 2015, pp. 279-287.
Kim et al., "Carvacrol Protects against Hepatic Steatosis in Mice Fed a High-Fat Diet by Enhancing SIRT1-AMPK Signaling", Evidence-Based Complementary and Alternative Medicine, vol. 2013, 2013, pp. 1-10.
Zhou et al., "Glycine Protects against High Sucrose and High Fat-Induced Non-Alcoholic Steatohepatitis in Rats", Oncotarget, vol. 07, Issue No. 49, 2016, pp. 80223-80237.
Kang et al., "Inhibitory Effects of Thymol Isolated from Curcuma Longa L. on Adipogenesis in HepG2 Cells", Processes, vol. 08, 2020, pp. 1-10.
Japanese Office Action for Appl No. 2023-535471 dated Dec. 2, 2025, 4 pages.

*Primary Examiner* — Raymond J Henley, III
(74) *Attorney, Agent, or Firm* — K&L Gates LLP

(57) ABSTRACT

The present disclosure generally relates to compositions and methods that can treat or prevent nonalcoholic fatty liver disease (NAFLD), non-alcoholic steatohepatitis (NASH), hepatitis and/or hepatic steatosis (fatty liver). More specifically, the present disclosure relates to administering a formulation comprising a combination of at least one glycine or functional derivative thereof, and/or at least one N-acetylcysteine or functional derivative thereof, and at least one thymol and/or carvacrol, in an amount effective to decrease liver steatosis. The formulation can concomitantly decrease liver damages, in particular those observed in patients with NAFLD.

16 Claims, 3 Drawing Sheets

COMPOSITIONS AND METHODS USING AT LEAST ONE GLYCINE OR DERIVATIVE THEREOF AND/OR AT LEAST ONE N-ACETYLCYSTEINE OR DERIVATIVE THEREOF, AND AT LEAST ONE THYMOL AND/OR CARVACROL

CROSS REFERENCE TO RELATED APPLICATIONS

The present application is a National Stage of International Application No. PCT/EP2021/085403, filed on Dec. 13, 2021, which claims priority to European Patent Application No. 20215292.2, filed on Dec. 18, 2020, the entire contents of which are being incorporated herein by reference.

BACKGROUND

The present disclosure generally relates to compositions and methods that can treat or prevent nonalcoholic fatty liver disease (NAFLD), non-alcoholic steatohepatitis (NASH), and/or hepatic steatosis (fatty liver). More specifically, the present disclosure relates to administering a formulation comprising a combination of at least one glycine or functional derivative thereof, and/or at least one N-acetylcysteine or functional derivative thereof, and at least one thymol and/or carvacrol, in an amount effective to decrease liver steatosis. The formulation can concomitantly decrease liver damages, in particular those observed in patients with NAFLD.

Nonalcoholic fatty liver disease (NAFLD) is the most common hepatic disease in Western countries and is defined as evidence of hepatic steatosis in the absence of secondary causes such as significant alcohol consumption, long-term use of a steatogenic medication, or monogenic hereditary disorders. NAFLD currently affects around 25% of the world population and suffers from a lack of therapy.

NAFLD refers to a group of conditions where there is accumulation of excess fat in the liver of people who drink little or no alcohol. NAFLD comprises a wide spectrum of liver damage, ranging from simple macrovesicular steatosis to steatohepatitis, advanced fibrosis, and cirrhosis (Sumida et a. 2018, Journal of gastroenterology, 53, 362-376). The most common form of NAFLD is a non-serious condition called fatty liver. In fatty liver, fat accumulates in the liver cells. The majority of individuals with NAFLD have no symptoms and a normal examination.

In a small number of people with fatty liver, the accumulation of fat can cause liver cell damage and inflammation. This is referred to as non-alcoholic steatohepatitis (NASH).

Liver inflammation can in turn lead to fibrosis and scarring of the liver tissue, which can impair the liver's ability to function (NAFLD-associated cirrhosis). With time, liver cirrhosis can led to liver failure, which may require liver transplantation.

NAFLD is related to insulin resistance and the metabolic syndrome and is associated with diabetes mellitus type 2 and hyperlipidemia and obesity. NAFLD affects around 25-30% of the world population and about 80% of obese people.

Non-alcoholic steatohepatitis (NASH) is the most extreme form of NAFLD, and is regarded as a major cause of cirrhosis of the liver of unknown cause and can lead to the development of end stage liver disease and to primary liver cancer. About 2-8% of the world population suffers from NASH. NASH is commonly associated with metabolic syndrome (obesity, dyslipidemia and insulin resistance). Further progression of the disease is probably caused by chronic inflammation and reactive oxygen species formation. Metabolically induced liver inflammation recruits additional inflammatory components and causes NASH. A retrospective cohort study concluded that liver failure is the main cause of morbidity and mortality in NASH-associated cirrhosis.

Treatment of the symptoms of NAFLD/NASH include dietary interventions, vitamin E, lipid lowering medications and insulin sensitizing medications. It may also include reduction of total cholesterol levels, weight loss, control of any underlying diabetes, reduction or elimination of alcohol consumption, and regular exercise. However, there are no drugs currently approved to prevent or treat NAFLD or NASH.

Effective measures to provide NAFLD patients with appropriate treatments and adequate nutrition remain lacking.

SUMMARY

Therapies aimed to treat NAFLD should ideally target one or several of the pathological processes that contribute to the diseases: hepatic fat accumulation, mitochondrial dysfunction and oxidative stress, inflammation, hepatic fibrosis, and gut dysbiosis. The inventors surprisingly found that the different combinations of compounds disclosed herein elicited a profound decrease in liver steatosis and NASH in liver humanized mice, which correlated with a concomitant decrease in circulating liver enzymes AST and ALT, indicating a decrease in liver damage. Moreover, treatment with a combination of Glycine, NAC and thymol decreased hepatic triglycerides.

Accordingly, in a general embodiment, the present disclosure provides a composition comprising an effective amount of a combination of at least one glycine or functional derivative thereof and/or at least one N-acetylcysteine or functional derivative thereof, and at least one thymol and/or carvacrol for use in treatment, prevention or management of progression of nonalcoholic fatty liver disease (NAFLD), non-alcoholic steatohepatitis (NASH), hepatic steatosis (fatty liver) and/or associated liver damage in an individual in need thereof.

The present invention also provides a method of making a therapeutic composition, the method comprising adding a combination of at least one glycine or functional derivative thereof and/or at least one N-acetylcysteine or functional derivative thereof, and at least one thymol and/or carvacrol to a base composition to form the therapeutic composition, the therapeutic composition comprising an amount of the combination per serving that is effective to decrease hepatic triglycerides and/or circulating AST and ALT enzymes in an individual in need thereof. The base composition can be formulated for administration by at least one route selected from the group of oral, enteral, parenteral and intravenous injection.

An advantage of one or more embodiments provided by the present disclosure is to improve the condition of individuals having a liver disease, e.g. NAFLD, NASH, hepatitis, or a gastrointestinal condition such as inflammation, Crown's, mucositis or gut dysbiosis, for example, or is at risk of developing such condition.

Another advantage of one or more embodiments provided by the present disclosure is to prevent or treat hepatic fat accumulation and liver damage.

Another advantage of one or more embodiments provided by the present disclosure is a composition that can be administered parenterally or enterally, for example as an aqueous liquid composition, to an individual or a critically ill patient.

Additional features and advantages are described m, and will be apparent from, the following Detailed Description and the Figures.

Liver weight(% of total body weight) and liver triglyceride levels (nmol/mg tissue) in liver humanized mice following a 8-week treatment with the indicated compounds. Data are represented as mean±SEM (n=4 to 8 per group). T-student*p<0.05, **p<0.01.

Figure 2:
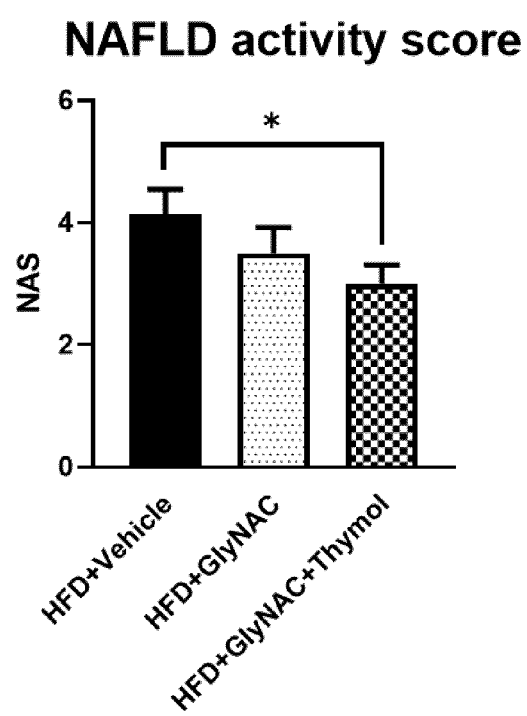

FIG. 2. Liver histological evaluation in liver humanized mice

NAFLD activity score (NAS) in liver humanized mice following a 8-week treatment with the indicated compounds. Data are represented as mean±SEM (n=7 to 8 per group). T-student*p<0.05.

Figure 3:
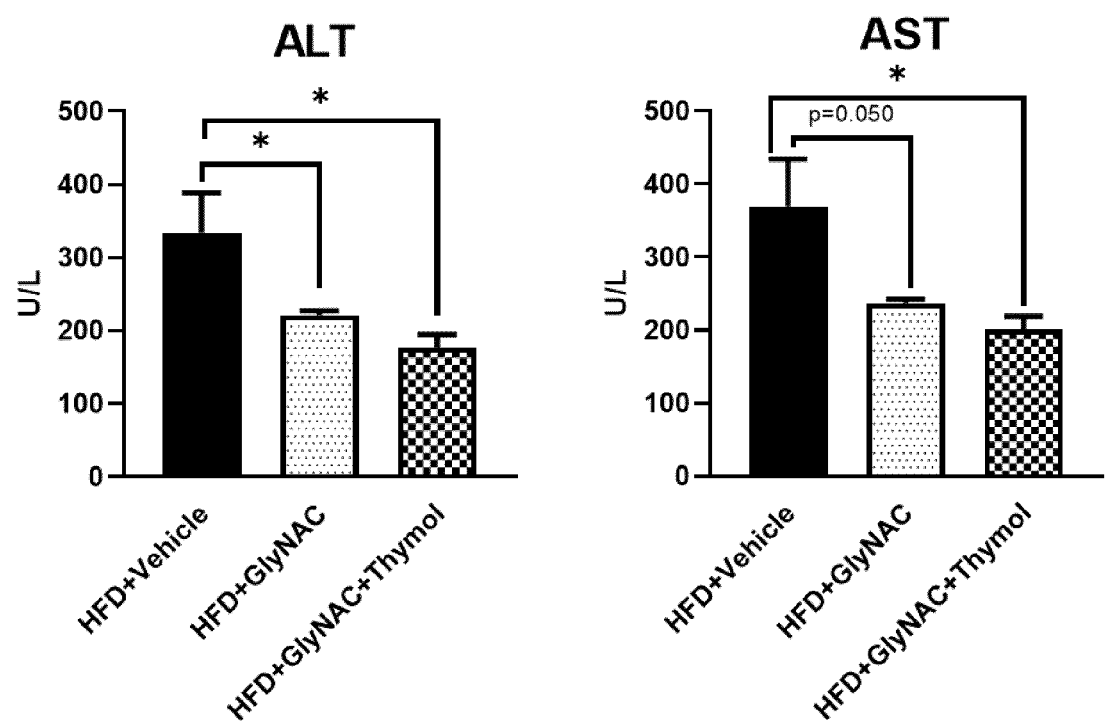

FIG. 3. Plasma AST and ALT levels in liver humanize mice

Plasma aspartate aminotransferase (AST) and alanine aminotransferase (ALT) levels (U/L) in liver humanized mice following a 8-week treatment with the indicated compounds. Data are represented as mean±SEM (n=7 to 8 per group). T-student*p<0.05.

DETAILED DESCRIPTION

Definitions

Some definitions are provided hereafter. Nevertheless, definitions may be located in the "Embodiments" section below, and the above header "Definitions" does not mean that such disclosures in the "Embodiments" section are not definitions.

All percentages are by weight of the total weight of the composition unless expressed otherwise. Similarly, all ratios are by weight unless expressed otherwise. When reference is made to the pH, values correspond to pH measured at 25° C. with standard equipment. As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used herein and in the appended claims, the singular form of a word includes the plural, unless the context clearly dictates otherwise. Thus, the references "a," "an" and "the" are generally inclusive of the plurals of the respective terms. For example, reference to "an ingredient" or "a method" includes a plurality of such "ingredients" or "methods." The term "and/or" used in the context of "X and/or Y" should be interpreted as "X," or "Y," or "X and Y." Similarly, "at least one of X or Y" should be interpreted as "X," or "Y," or "both X and Y."

Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. "Consisting essentially of" means that the embodiment comprises more than 50 wt. % of the identified components, preferably at least 75 wt. % of the identified components, more preferably at least 85 wt. % of the identified components, most preferably at least 95 wt. % of the identified components, for example at least 99 wt. % of the identified components.

Where used herein, the term "example," particularly when followed by a listing of terms, is merely exemplary and illustrative, and should not be deemed to be exclusive or comprehensive. Any embodiment disclosed herein can be combined with any other embodiment disclosed herein unless explicitly indicated otherwise.

"Animal" includes, but is not limited to, mammals, which includes but is not limited to rodents, aquatic mammals, domestic animals such as dogs and cats, farm animals such as sheep, pigs, cows and horses, and humans. Where "animal," "mammal" or a plural thereof is used, these terms also apply to any animal that is capable of the effect exhibited or intended to be exhibited by the context of the passage, e.g., an animal capable of autophagy. As used herein, the term "patient" is understood to include an animal, for example a mammal, and preferably a human that is receiving or intended to receive treatment, as treatment is herein defined. While the terms "individual" and "patient" are often used herein to refer to a human, the present disclosure is not so limited.

Accordingly, the terms "individual" and "patient" refer to any animal, mammal or human that can benefit from the methods and compositions disclosed herein. Indeed, non-human animals undergo prolonged critical illness that mimics the human condition. These critically ill animals undergo the same metabolic, immunological and endocrine disturbances and development of organ failure and muscle wasting as the human counterpart. Moreover, animals experience the effects of ageing as well.

The term "elderly" in the context of a human means an age from birth of at least 55 years, preferably above 63 years, more preferably above 65 years, and most preferably above 70 years. The term "older adult" or "ageing individual" in the context of a human means an age from birth of at least 45 years, preferably above 50 years, more preferably above 55 years, and includes elderly individuals.

For other animals, an "older adult" or "ageing individual" has exceeded 50% of the average lifespan for its particular species and/or breed within a species. An animal is considered "elderly" if it has surpassed 66% of the average expected lifespan, preferably if it has surpassed the 75% of the average expected lifespan, more preferably if it has surpassed 80% of the average expected lifespan. An ageing cat or dog has an age from birth of at least about 5 years. An elderly cat or dog has an age from birth of at least about 7 years.

The term "NAFLD" (Non Alcoholic Fatty Liver Disease) refers to a group of conditions where there is accumulation of excess fat in the liver of people who drink little or no alcohol. NAFLD comprises a wide spectrum of liver damage, ranging from simple macrovesicular steatosis to steatohepatitis, advanced fibrosis, and cirrhosis. The majority of individuals with NAFLD have no symptoms and a normal examination. Children may exhibit symptoms such as abdominal pain, which may be in the center or the right upper part of the abdomen, and sometimes fatigue. In many patients, NAFLD is associated with metabolic risk factors such as obesity, diabetes mellitus, and dyslipidemia.

Nonalcoholic fatty liver is defined as the presence of hepatic steatosis with no evidence of hepatocellular injury in the form of ballooning of the hepatocytes.

The term "NASH" (Non-alcoholic steatohepatitis) refers to the most extreme form of NAFLD, and is regarded as a major cause of cirrhosis of the liver of unknown cause and can lead to the development of end stage liver disease and to primary liver cancer. NASH is defined as the presence of hepatic steatosis and inflammation with hepatocyte injury (ballooning) with or without fibrosis.

The term "Hepatotoxicity" refers to the injury or liver damage. It can be caused by exposure to toxicants and drugs but also by the accumulation of toxic lipid species in the liver. The hepatic injury can be classified into hepatocellular, cholestatic and mixed, caused by increase in alanine aminotransferase and alkaline phosphatase than upper limit of normal.

The terms "treatment" and "treating" include any effect that results in the improvement of the condition or disorder, for example lessening, reducing, modulating, or eliminating the condition or disorder. The term does not necessarily imply that a subject is treated until total recovery. Non-limiting examples of "treating" or "treatment of" a condition or disorder include: (1) inhibiting the condition or disorder, i.e., arresting the development of the condition or disorder or its clinical symptoms and (2) relieving the condition or disorder, i.e., causing the temporary or permanent regression of the condition or disorder or its clinical symptoms. A treatment can be patient- or doctor-related.

The terms "prevention" or "preventing" mean causing the clinical symptoms of the referenced condition or disorder to not develop in an individual that may be exposed or predisposed to the condition or disorder but does not yet experience or display symptoms of the condition or disorder. The terms "condition" and "disorder" mean any disease, condition, symptom, or indication.

The terms "food," "food product" and "food composition" mean a product or composition that is intended for ingestion by an individual such as a human and provides at least one nutrient to the individual. The compositions of the present disclosure, including the many embodiments described herein, can comprise, consist of, or consist essentially of the essential elements and limitations described herein, as well as any additional or optional ingredients, components, or limitations described herein or otherwise useful in a diet.

As used herein, "complete nutrition" contains sufficient types and levels of macronutrients (protein, fats and carbohydrates) and micronutrients to be sufficient to be a sole source of nutrition for the animal to which the composition is administered. Individuals can receive 100% of their nutritional requirements from such complete nutritional compositions.

As used herein, the term "critically ill patient" is an individual experiencing an acute life-threatening episode or diagnosed to be in imminent danger of such an episode. A critically ill patient is medically unstable and, when not treated, likely to die (e.g., >50% chance of death). Non-limiting examples of critically ill patients include a patient who has sustained or is at risk of sustaining acutely life-threatening single or multiple organ system failure due to disease or injury, a patient who is being operated upon and where complications supervene, and a patient who has a vital organ operated upon within the last week or who has been subject to major surgery within the last week. More specific non-limiting examples of a critically ill patient include a patient who has sustained or is at risk of sustaining acutely life-threatening single or multiple organ system failure due to disease or injury and a patient who is being operated upon and where complications supervene. Additional specific non-limiting examples of a critically ill patient include a patient in need of one or more of cardiac surgery, cerebral surgery, thoracic surgery, abdominal surgery, vascular surgery, or transplantation; and a patient suffering from one or more of a neurological disease, cerebral trauma, respiratory insufficiency, abdominal peritonitis, multiple trauma, a severe burn, or critical illness polyneuropathy.

The term "enterally administering" encompasses oral administration (including oral gavage administration), as well as rectal administration, although oral administration is preferred. The term "parenterally administering" refers to delivery of substances given by routes other than the digestive tract and covers administration routes such as intravenous, intra-arterial, intramuscular, intracerebroventricular, intraosseous, intradermal, intrathecal, and also intraperitoneal administration, intravesical infusion and intracavernosal injection.

Preferred parenteral administration is intravenous administration. A particular form of parenteral administration is delivery by intravenous administration of nutrition. Parenteral nutrition is "total parenteral nutrition" when no food is given by other routes. "Parenteral nutrition" is preferably a isotonic or hypertonic aqueous solution (or solid compositions to be dissolved, or liquid concentrates to be diluted to obtain an isotonic or hypertonic solution) comprising a saccharide such as glucose and further comprising one or more of lipids, amino acids, and vitamins.

Embodiments

Accordingly, in a general embodiment, the present disclosure provides a composition comprising an effective amount of a combination of at least one glycine or functional derivative thereof and/or at least one N-acetylcysteine or functional derivative thereof, and at least one thymol and/or carvacrol for use in treatment, prevention or management of progression of nonalcoholic fatty liver disease (NAFLD), non-alcoholic steatohepatitis (NASH), hepatic steatosis (fatty liver) and/or associated liver damage in an individual in need thereof. The composition further prevents hepatotoxicity.

Ingredients—Main Bioactive Compounds

The combination of at least one glycine or functional derivative thereof and/or at least one N-acetylcysteine or functional derivative thereof can be provided by any of the compositions disclosed by U.S. Pat. Nos. 8,362,080, 8,802, 730 and 9,084,760, each entitled "Increasing glutathione levels for therapy," and U.S. Patent App. Pub. No. 2018/0161297 entitled "Benefits of Supplementation with N-Acetylcysteine and Glycine to Improve Glutathione Levels," each incorporated herein by reference in its entirety.

Non limiting example of "functional derivative" of N-acetylcysteine according to the present invention is selected from N-({2-[(ethylsulfonyl)amino]ethyl}sulfonyl)-L-alanine, N-acetyl-S-(1Z)-propenyl-cysteine-sulfoxide, S-(5-acetamido-2-hydroxyphenyl)cysteine, S-2-chloroethylcysteine), D-cysteinederivative, L-cysteine derivative, cysteic acid, cysteinyl-aminoacid, cystine, gamma-glutamylcysteinylglutamate, grixazone B, hawkinsin, peptidyl-cysteine, prenylcysteine, S-acetamidomethylcysteine, glutathione (GSH) and glutathione forms (liposomal GSH).

Non limiting example of "functional derivative of glycine, may be selected from the group consisting of L-glycine, L-glycine ethyl ester, D-Allylglycine; N-[Bis(methylthio)methylene]glycine methyl ester; Boc-allyl-Gly-OH (dicyclohexylammonium) salt; Boc-D-Chg-OH; Boc-Chg-OH; (R)—N-Boc-(2'-chlorophenyl)glycine; Boc-L-cyclopropylglycine; Boc-L-cyclopropylglycine; (R)—N-Boc-4-fluorophenylglycine; Boc-D-propargylglycine; Boc-(S)-3-thienylglycine; Boc-(R)-3-thienylglycine; D-a-Cyclohexylglycine; L-a-Cyclopropylglycine; N-(2-fluorophenyl)-N-(methylsulfonyl)glycine; N-(4-fluorophenyl)-N-methylsulfonyl)glycine; (Fmoc-N-(2,4-dimethoxybenzyl)-Gly-OH; N-(2-Furoyl)glycine; L-a-Neopentylglycine; D-Propargylglycine; sarcosine; Z-a-Phosphonoglycine trimethyl ester, and mixtures thereof.

The glycine and the N-acetylcysteine or L-cysteine or functional derivative may be formulated in a particular ratio. In some embodiments, the formulation may comprise these components in the following exemplary ratios: 1:1, 1:2, 1:3, 1:4, 1:5, 1:6, 1:7, 1:8, 1:9, 1:10, 1:12, 1:15, 1:20, 1:25, 1:30, 1:35, 1:40, 1:45, 1:50, 1:55, 1:60, 1:65, 1:70, 1:75, 1:80, 1:85, 1:90, 1:95, 1:100, 1:150, 1:200, 1:300, 1:400, 1:500, 1:600, 1:750, 1:1000, and 1:10,000, and each of these ratios can be GLY:NAC in some embodiments and NAC:GLY in other embodiments. In particular embodiments, the formulation may comprise these components in the following weight percentages (either the same for both glycine and the N-acetylcysteine or different weight percentages for each): 1%, 2%, 3%, 4%, 5%, 6%, 7%, 8%, 9%, 10%, 12%, 15%, 20%, 25%, 30%, 40%, 45%, 50%, 55%, 60%, 65%, 70%, 75%, 80%, 85%, 90%, 95%, 97%, or 99%, for example.

The N-acetylcysteine or functional derivative thereof can be administered in an amount of about 0.1-100 milligram (mg) of N-acetylcysteine (NAC) or functional derivative thereof per kilogram (kg) of body weight of the subject.

The glycine (GLY) or functional derivative thereof can be administered in an amount of about 0.1-100 milligram (mg) of glycine or functional derivative thereof per kilogram (kg) of body weight of the subject. In some embodiments, these amounts are provided at least partially by a di peptide comprising both the N-acetylcysteine or functional derivative thereof and the glycine or functional derivative thereof.

In another embodiment, collagen and collagen peptides may be used as source of glycine. Additionally, whey protein is rich in glycine and cysteine, so that in another embodiment, the glycine and N-acetylcysteine are provided by whey protein. Some plant-based protein source may also provide source of glycine.

In a particular non-limiting example, the daily doses for a 60 kg subject can be as follows:
NAC or functional derivative thereof: 6 to 6,000 mg/day
GL Y or functional derivative thereof: 6 to 6,000 mg/day The composition comprises an effective amount of thymol and/or carvacrol. Thymol (10-64%) is one of the major constituent of essential oils of thyme (*Thymus vulgaris L., Lamiaceae*) and *Origanum vulgare* (oregano). Carvacrol is present in the essential oil of *Origanum vulgare* (oregano), oil of thyme, oil obtained from pepperwort, and wild bergamot. The essential oil of thyme subspecies contains between 5% and 75% of carvacrol, while Satureja (savory) subspecies have a content between 1% and 45%. *Origanum majorana* (marjoram) and Dittany of Crete are rich in carvacrol, 50% and 60-80% respectively. Therefore, some embodiments of the composition comprise such plant and/or enriched plant extracts, essential oils or fractions that provide at least a portion of thymol and/carvacrol in the composition, in particular from thyme and oregano.

In another embodiment, thymol and/or carvacrol are provided in the form of chemically-synthetized compounds.

In an embodiment, thymol and/or carvacrol can be administered daily in the weight range of 0.05 mg-1 g per kg body weight, preferably 1 mg-200 mg per kg body weight, more preferably 5 mg-150 mg per kg body weight, even more preferably 10 mg-120 mg per kg body weight, or most preferably 40 mg-80 mg per kg body weight. In aqueous liquid compositions, concentration preferably ranges from about 0.05 wt. % to about 4 wt. %, or from about 0.5 wt. % to about 2 wt. % or from about 1.0 wt. % to about 1.5 wt. % of the aqueous liquid composition.

Typically between 50 μg to 10 g of thymol, per daily serving in one or more portions is administered to an individual.

In an embodiment, the at least one glycine or functional derivative thereof, and/or the at least one N-acetylcysteine or functional derivative thereof, and the at least one thymol and/or carvacrol are administered in the same composition.

In another embodiment, the at least one glycine or functional derivative thereof, and/or the at least one N-acetylcysteine or functional derivative thereof, and the at least one thymol and/or carvacrol are administered in different composition relative to the remainder of the combination.

In some embodiments, the composition is administered to the individual in a single dosage form, i.e. all compounds are present in one product to be given to an individual in combination with a meal. In other embodiments, the composition is co-administered in separate dosage forms, for example at least one component separately from one or more of the other components of the composition.

The composition can be administered at least one day per week, preferably at least two days per week, more preferably at least three or four days per week (e.g., every other day), most preferably at least five days per week, six days per week, or seven days per week. The time period of administration can be at least one week, preferably at least one month, more preferably at least two months, most preferably at least three months, for example at least four months. In an embodiment, dosing is at least daily; for example, a subject may receive one or more doses daily. In some embodiments, the administration continues for the remaining life of the individual. In other embodiments, the administration occurs until no detectable symptoms of the medical condition remain. In specific embodiments, the administration occurs until a detectable improvement of at least one symptom occurs and, in further cases, continues to remain ameliorated.

Ingredients—Further Bioactive Compound

The compositions for use according to the invention may also comprise at least one further bioactive compound selected from the group consisting of antioxidants, anti-inflammatory compounds, glycosaminoglycans, prebiotics, fibres, probiotics, fatty acids, enzymes, minerals, trace elements and/or vitamins.

The term "bioactive" in the context of the present application means that the compound contributes to the health of an individual, or has an effect on the human body, beyond that of meeting basic nutritional need.

The at least one further bioactive compound may be from a natural source. Thus the compounds may be from extracts of plants, animals, fish, fungi, algae, microbial fermentation. Minerals are considered as from natural source also within this definition.

Nutritional Compositions

The compositions for use according to the invention may be nutritional compositions or pharmaceutical compositions, and may be for human or veterinary use.

Thus, in preferred embodiments, the composition for use according to the invention is a nutritional composition. By "nutritional composition" is meant in the context of the present application a composition which is a source of nutrition to an individual.

The nutritional products or compositions of the invention may be a source of complete nutrition or may be a source of incomplete nutrition.

As used herein, "complete nutrition" includes nutritional products and compositions that contain sufficient types and levels of macronutrients (protein, fats and carbohydrates) and micronutrients to be sufficient to be a sole source of nutrition for the animal to which it is being administered to. Patients can receive 100% of their nutritional requirements from such complete nutritional compositions.

As used herein, "incomplete nutrition" includes nutritional products or compositions that do not contain sufficient levels of macronutrients (protein, fats and carbohydrates) or micronutrients to be sufficient to be a sole source of nutrition for the animal to which it is being administered to. Partial or incomplete nutritional compositions can be used as a nutritional supplement.

The combination of ingredients can be administered in any composition that is suitable for human and/or animal consumption. In a preferred embodiment, it is administered to the individual orally or enterally (e.g. tube feeding). For example, it can be administered to the individual in a beverage, a food product, a capsule, a tablet, a powder or a suspension.

Non-limiting examples of suitable compositions for the include food compositions, dietary supplements, dietary supplements (e.g., liquid ONS), complete nutritional compositions, beverages, pharmaceuticals, oral nutritional supplement, medical food, nutraceuticals, food for special medical purpose (FSMP), powdered nutritional products to be reconstituted in water or milk before consumption, food additives, medicaments, drinks, pet food, and combinations thereof.

Nutritional Composition Ingredients

Protein Source

In an embodiment, the compositions for use according to the invention include a source of protein. The protein source may be dietary protein including, but not limited to animal protein (such as milk protein, meat protein or egg protein), vegetable protein (such as soy protein, wheat protein, rice protein, and pea protein), or combinations thereof. In an embodiment, the protein is selected from the group consisting of whey, chicken, corn, caseinate, wheat, flax, soy, carob, pea or combinations thereof.

Carbohydrate Source

In an embodiment, the compositions include a source of carbohydrates. Any suitable carbohydrate may be used in the present compositions including, but not limited to, starch, sucrose, lactose, glucose, fructose, corn syrup solids, maltodextrin, modified starch, amylase starch, tapioca starch, corn starch, xylitol, sorbitol or combinations thereof.

Fat Source

In an embodiment, the compositions include a source of fat. The source of fat may include any suitable fat or fat mixture. For example, the fat source may include, but is not limited to, vegetable fat (such as olive oil, corn oil, sunflower oil, high-oleic sunflower, rapeseed oil, canola oil, hazelnut oil, soy oil, palm oil, coconut oil, blackcurrant seed oil, borage oil, lecithins, and the like), animal fats (such as milk fat), or combinations thereof. The source of fat may also be less refined versions of the fats listed above (e.g., olive oil for polyphenol content).

Flavourings etc.

In addition, compositions for use according to the invention may also comprise natural or artificial flavours, for example fruit flavours like banana, orange, peach, pineapple or raspberry or other plant flavours like vanilla, cocoa, coffee, etc.

Nutritional Composition Formats

The nutritional compositions may include, besides the main bioactive components and any further bioactive components, and optionally one or more of a protein, carbohydrate and fat source, any number of optional additional food ingredients, including conventional food additives (synthetic or natural), for example one or more acidulants, additional thickeners, buffers or agents for pH adjustment, chelating agents, colorants, emulsifiers, excipient, flavor agent, mineral, osmotic agents, a pharmaceutically acceptable carrier, preservatives, stabilizers, sugar, sweeteners, texturizers, and/or vitamins. The optional ingredients can be added in any suitable amount.

The nutritional composition may be provided in any suitable format. Examples of nutritional composition formats in which the composition for use according to the invention may be provided include solutions, ready-for-consumption compositions (e.g. ready-to-drink compositions or instant drinks), liquid comestibles, soft drinks, juice, sports drinks, milk drinks, milk-shakes, yogurt drinks, soup, etc. In a other embodiments, the nutritional compositions may be provided in the form of a concentrate, a powder, or granules (e.g. effervescent granules), which are diluted with water or other liquid, such as milk or fruit juice, to yield the ready-for-consumption composition.

Further nutritional composition formats include, baked products, dairy products, desserts, confectionery products, cereal bars, and breakfast cereals. Examples of dairy products include milk and milk drinks, yoghurts and other cultured milk products, ice creams and cheeses. Examples of baked products include bread, biscuits and cakes.

In one embodiment, the composition for use according to the invention may also be available in a great variety of formats designed as animal foods, in particular for the dog or the cat, whether in a wet form, semi-wet form or dry form, in particular in the form of biscuits.

Routes of Administration

The nutritional compositions of the present disclosure may be administered by any means suitable for human administration, and in particular for administration in any part of the gastrointestinal tract. Enteral administration, oral administration, and administration through a tube or catheter are all covered by the present disclosure. The nutritional compositions may also be administered by means selected from oral, rectal, sublingual, sublabial, buccal, topical, etc.

The nutritional compositions may be administered in any known form including, for example, tablets, capsules, liquids, chewables, soft gels, sachets, powders, syrups, liquid suspensions, emulsions and solutions in convenient dosage forms. In soft capsules, the active ingredients are preferably dissolved or suspended in suitable liquids, such as fatty oils, paraffin oil or liquid polyethylene glycols. Optionally, stabilizers may be added.

If the nutritional compositions are administered by tube feeding, the nutritional compositions may be used for short term or long term tube feeding.

Method of Manufacturing a Nutritional Composition of the Invention

The invention relates in a further aspect to a method for manufacturing a nutritional composition for use according to the invention, said method comprising the step of: providing one or more ingredients for a nutritional composition, at least one glycine or functional derivative thereof and/or at least one N-acetylcysteine or functional derivative thereof, and at least one thymol and/or carvacrol, and mixing.

Pharmaceutical Composition for use.

In a further embodiment, the invention relates to a composition for use to treat or prevent nonalcoholic fatty liver disease (NAFLD), non-alcoholic steatohepatitis (NASH), hepatitis, hepatic steatosis (fatty liver) and/or associated liver damage in an individual in need thereof.

By pharmaceutical means a composition, other than a nutritional composition, wherein a substance is used on or in the body to prevent, diagnose, alleviate, treat, or cure a disease in humans or animals in medicine.

The pharmaceutical may be for use by a human. It may alternatively be a veterinary composition, for example suited for a dog, cat, or horse, in particular a thoroughbred horse.

In one preferred embodiment, the pharmaceutical composition of the invention comprises a combination of at least one glycine or functional derivative thereof and/or at least one N-acetylcysteine or functional derivative thereof, and at least one thymol and/or carvacrol. The invention further relates to uses of the pharmaceutical according to the invention, as described herein as use of the compositions of the invention.

A pharmaceutical composition for use according to the invention comprising a combination of at least one glycine or functional derivative thereof and/or at least one N-acetylcysteine or functional derivative thereof, and at least one thymol and/or carvacrol with at least one excipient selected from the group constituted by the pharmaceutically acceptable excipients. Procedures for the preparation of pharmaceutical compositions according to the invention can easily be found by the specialist skilled in the art, for example in the handbook Remington's Pharmaceutical Sciences, Mid. Publishing Co, Easton, Pa., USA Physiologically acceptable excipients, vehicles and adjuvants are also described in the handbook entitled "Handbook of Pharmaceutical Excipients, Second edition, American Pharmaceutical Association, 1994. In order to formulate a pharmaceutical composition according to the invention, the specialist skilled in the art will advantageously be able to refer to the latest edition of the European Pharmacopoeia or the Pharmacopoeia of the United States of America (USP). The specialist skilled in the art will in particular be able advantageously to refer to the fourth edition "2002" of the European Pharmacopoeia or also to the edition USP 25-NF 20 of the American Pharmacopoeia (U.S. Pharmacopoeia).

Advantageously, a pharmaceutical composition such as defined above is suitable for oral, parenteral or intravenous administration. When the pharmaceutical composition for use according to the invention comprises at least one pharmaceutically or physiologically acceptable excipient, it is in particular an excipient appropriate for administration of the composition by the oral route or an excipient suitable for administration of the composition by the parenteral route.

A pharmaceutical composition for use according to the invention is available indifferently in a solid or liquid form. For oral administration, a solid pharmaceutical composition in the form of tablets, capsules or gelatine capsules will be preferred.

In liquid form, a pharmaceutical composition in the form of an aqueous or non-aqueous suspension, or also in the form of a water-in-oil or oil-in-water emulsion will be preferred. Solid pharmaceutical forms may comprise, as vehicles, adjuvants or excipients, at least one diluent, one flavour, one solubilising agent, one lubricant, one suspension agent, one binder, one disintegrating agent and one encapsulating agent. Such compounds are for example magnesium carbonate, magnesium stearate, talc, lactose, pectin, dextrin, starch, gelatine, cellulosic materials, cocoa butter, etc. The compositions in liquid form may also comprise water, possibly as a mixture with propylene glycol or polyethylene glycol, and possibly also colouring agents, flavours, stabilisers and thickening agents.

Method of Treatment and Target Group

The composition according to the present invention is for use in treatment, prevention or management of nonalcoholic fatty liver disease (NAFLD), non-alcoholic steatohepatitis (NASH), hepatic steatosis (fatty liver), hepatitis, and/or associated liver damage in an individual in need. It comprises an effective amount of a combination of at least one glycine or functional derivative thereof and/or at least one N-acetylcysteine or functional derivative thereof, and at least one thymol and/or carvacrol.

As used herein, "effective amount" is an amount that prevents a deficiency, treats a disease or medical condition in an individual or, more generally, reduces symptoms, manages progression of the diseases or provides a nutritional, physiological, or medical benefit to the individual.

The effective amount of a composition according to the present invention which is required to achieve a therapeutical effect will, of course, vary with the particular composition, the route of administration, the age and condition of the recipient, and the particular disorder or disease being treated.

Elevated triglyceride levels may cause fatty liver disease and pancreatitis. High triglyceride levels can also be associated with diabetes, kidney disease, and the use of some medications. The inventors have found that a combination of glycine and N-acetylcysteine and thymol significantly decreased triglycerides levels in the liver and improves NASH at the histological level (NAS).

Thus, in an aspect of the present invention, the composition decreases hepatic triglycerides.

Moreover, the compositions for use according to the invention have been shown to decrease circulating liver enzyme. The enzymes aspartate aminotransferase (AST) and alanine aminotransferase (ALT) are found mainly in the liver and to a lesser extent in other organs like the kidney and muscle. In normal conditions AST and ALT levels in blood are low. High levels of circulating AST and ALT are considered markers of liver damage and are commonly used, in combination with other parameters, to diagnose NAFLD and other liver diseases, to evaluate the progression of liver diseases (including NAFLD) and the response to treatments.

Thus, the invention relates to a composition that prevents liver damage, in particular those associated with NAFLD.

In a further embodiment, the invention further provides methods of preventing or treating hepatotoxicity and/or liver damage, as evidenced by the decrease in circulating ALT/AST levels.

The individual in need thereof, can be an individual having a liver disease, e.g. NAFLD, NASH, hepatitis, or a gastrointestinal condition such as intestinal inflammation, such as colitis ulcerosa, Crown's, mucositis and gut dysbiosis, for example or is at risk of developing such condition.

The individual in need can be a critically ill patient. The compositions according to the present invention can be administered to an individual such as a human, e.g., an ageing individual or a critically ill individual, in a therapeutically effective dose. The therapeutically effective dose can be determined by the person skilled in the art and will depend on a number of factors known to those of skill in the art, such as the severity of the condition and the weight and general state of the individual.

Combination of Disclosures

It should be noted that embodiments and features described in the context of one of the aspects of the present invention also apply to the other aspects of the invention.

The compositions for use according to the invention are herein described in different parameters, such as the ingredients, nutritional composition formats, uses, target groups etc. It should be noted that embodiments and features described in the context of one of the parameters of the composition for use according to the invention, may also be combined with other embodiments and features described in the context of another parameter, unless expressly stated otherwise.

All patent and non-patent references cited m the present application, are hereby incorporated by reference in their entirety.

The invention will now be described in further details in the following non-limiting example.

EXAMPLE

Example 1: Liver Humanized Mice Study

The current preclinical rodent models of NAFLD are inadequate at predicting human responses to specific interventions in part because they do not show the full pathology of human disease. To evaluate the effect of cellular nutrients in NAFLD, we took advantage of a novel liver humanized mouse model called humanized liver FRGN® mice that closely resembles human liver metabolism and lipoprotein profiles (Azuma et al., 2007, Robust expansion of human hepatocytes in Fah−/−/Rag2−/−/Il2rg−/−mice. Nat Biotechnol, 25, 903-10; Minniti et al., 2020 Insights From Liver-Humanized Mice on Cholesterol Lipoprotein Metabolism and LXR-Agonist Pharmacodynamics in Humans. Hepatology, 72, 656-670.).

Materials and Methods

Male Fah−/−; Rag2−/−; Il2rg−/− KO mice on a NOD background (FRGN® mice) were transplanted with human hepatocytes from a donor homozygous for the G allele on the minus strand of rs738409. This mutation in the PNPLA3 gene is significantly associated with high risk of NASH development in humans (Trépo et al. 2016, PNPLA3 gene in liver diseases. *J Hepatol*, 65, 399-412).

Generation and husbandry of the mice, administration of test articles, and collection of samples for analysis was performed at the testing facility of Yecuris Corporation (Tualatin, Oregon, USA). Mice were administered the prophylactic antibiotic sulfamethoxazole and trimethoprim (SMX/TMP, 640 µg/mL/128 µg/mL, respectively) every other week in their drinking water and were administered the protective drug 2-(2-Nitro-4-trifluoromethylbenzoyl)-1,3-cyclohexanedione (Nitisinone, NTBC, 8 mg/L) for three days monthly. Twelve weeks after the transplantation of human hepatocytes, liver humanized mice either continued in a control chow diet (PicoLab® High Energy Mouse Diet, 5LJ5 chow), or where given a diet rich in fat, fructose and cholesterol (Research Diets Inc., Catalog No. A16091202) ad libitum to induce hepatic steatosis (hence after termed high fat diet (HFD). After the first 8 weeks in the HFD diet, mice were daily administered the test or control articles described in Table 1 via oral gavage for 8 more weeks and kept in their respective diets.

TABLE 1

Treatments

| Diet | Article | Dose (mg/ Kg body weight) | Treatment Duration |
|---|---|---|---|
| Chow | Vehicle | DMSO: 55 mg/Kg | 8 weeks |
| High Fat | Vehicle | DMSO: 55 mg/Kg | 8 weeks |
| High Fat | Glycine + NAC | Glycine: 200 mg/ Kg NAC: 200 mg/Kg | 8 weeks |
| High Fat | Glycine + NAC + Thymol | Glycine: 200 mg/Kg NAC: 200 mg/Kg Thymol: 20 mg/Kg | 8 weeks |

Mice were daily administered test or control articles (vehicle) via oral gavage for 8 weeks. Abbreviations: N-acetyl cysteine (NAC); DMSO, Dimethyl Sulfoxide.

At the end of the 8-week treatment period, mice were sacrificed for organ and plasma collection. Mouse cocktail (ketamine/xylazine) was administered according to mouse body weight (12.5 µL/g). Once mice were fully anesthetized, the peritoneum and thoracic cavity were opened and whole blood was collected via a cardiac puncture. The blood samples were immediately transferred to pre-chilled K2EDTA tubes stored on ice. Plasma was isolated by centrifugation at 1600×g for 20 minutes at 4° C. The liver was isolated, weighed, and immediately snap frozen or fixed in PFA for histological evaluation.

Liver triglycerides were measured from a piece of liver of approximatively 50 mg using the Triglyceride-Glo™ Assay (Promega) and a glycerol standard according to the manufacturer's instructions. Liver triglyceride concentrations were normalized by the weight of the liver tissue used for the quantification.

Histological scores were conducted from H&E stained liver samples by a blinded clinical pathologist using the NAFLD activity score (NAS) system from NASH-CRN (Kleiner et al., 2005, Design and validation of a histological scoring system for nonalcoholic fatty liver disease, Hepatology, 41(6): 1313-21). This score includes scores for the steatosis grade (0: <5%, 1:5-33%, 2: >33-66% and 3:>66%), lobular inflammation (0: no foci, 1: <2 foci/200× field, 2: 2-4 foci, 3: >4 foci) and ballooning degeneration (0: none, 1: few ballooning cells, 2: many cells/prominent ballooning) which are used to generate an overall score (NAS, from O to 8).

Plasma samples collected at sacrifice were used to determine plasma alanine transaminase (ALT) and aspartate transaminase (AST) activities using commercial kits from Abbot Laboratories (REF #8L92-22 and 8L91-21, respectively, Abbott Laboratories, Chicago, Illinois, USA) and the automatic biochemistry analyzer Architect Ci4100 (Abbott Laboratories), according to the manufacturer's instructions.

Results

Figure 1:
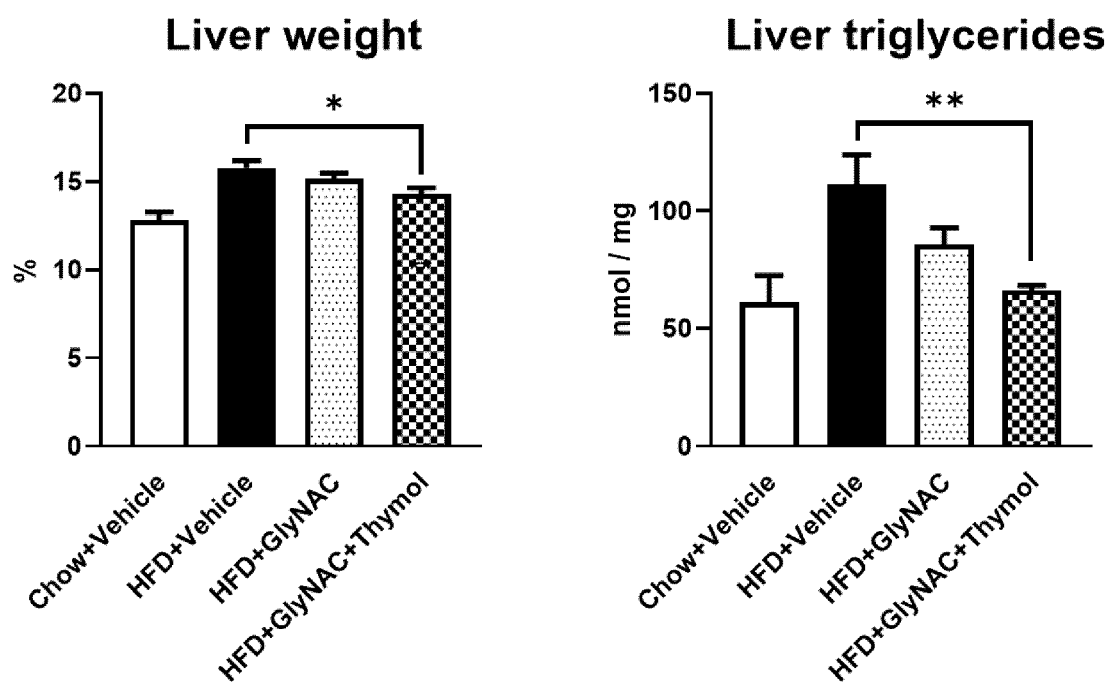
FIG. 1. Liver weight and liver triglyceride levels in liver humanized mice

Liver humanized mice maintained on a HFD for 16 weeks developed liver steatosis as expected, which was evidenced by an increase in liver weight and liver triglycerides compared to mice in a control diet (FIG. 1). Mice in HFD treated with Glycine and N-acetyl cysteine (GlyNAC) for 8 weeks showed a trend to present decreased liver triglycerides but it was not statistically significant when compared to the vehicle-treated group (p=0.09). In contrast, the combination of GlyNAC+thymol for the same treatment duration led to a significant decrease in liver weight and to a pronounced decrease in liver triglycerides, which were comparable to triglyceride levels in mice in the chow diet (FIG. 1).

Concomitantly to the observed decrease in liver triglycerides, treatment with GlyNAC+thymol significantly improved NASH at the histological level, as evidenced by a significant decrease in the NAFLD activity score, which is currently the most widely used measure of NAFLD grading (FIG. 2).

The enzymes aspartate aminotransferase (AST) and alanine aminotransferase (ALT) are found mainly in the liver and to a lesser extent in other organs like the kidney and muscle. In normal conditions AST and ALT levels in blood are low. High levels of circulating AST and ALT are considered markers of liver damage and are commonly used, in combination with other parameters, to diagnose and monitor the progression of NAFLD. When compared to vehicle-treated HFD controls, treatment with GlyNAC for 8 weeks decreased AST and ALT levels (FIG. 3) but only the decrease in ALT levels was found to be statistically significant. Treatment with GlyNAC and thymol for 8 weeks, further decreased both circulating AST and ALT levels in mice fed a HED, indicating an amelioration of liver damage that correlated with the observed decrease in liver triglycerides and improvement of NASH (FIGS. 1 and 2).

Treatment with GlyNAC and thymol elicited a profound decrease in liver steatosis in liver humanized mice fed a HFD, which correlated with an improvement in NASH (NAS) and with a decrease in circulating liver enzymes (ALT, AST), indicating a decrease in liver damage. Treatment with GlyNAC alone also decreased hepatic triglycerides but to a lesser extent. GlyNAC decreased circulating liver enzymes, albeit only the decrease in ALT levels was found to be statistically significant.

Aspects of the subject matter described herein are set out in the following numbered clauses:

1. A composition comprising an effective amount of a combination of at least one glycine or functional derivative thereof and/or at least one N-acetylcysteine or functional derivative thereof, and at least one thymol and/or carvacrol for use in treatment, prevention or management of progression of nonalcoholic fatty liver disease (NAFLD), non-alcoholic steatohepatitis (NASH), hepatic steatosis (fatty liver) and/or associated liver damage in an individual in need thereof.
2. The composition for use according to clause 1, wherein the combination is in an amount effective to decrease hepatic triglycerides and/or circulating AST and ALT enzymes.
3. The composition for use according to clause 1 or 2, which further prevents hepatotoxicity.
4. The composition for use according to any of clauses 1 to 3, wherein the at least one glycine or functional derivative thereof is selected from the group consisting of L-glycine, L-glycine ethyl ester, D-Allylglycine; N[Bis(methylthio)methylene]glycine methyl ester; Boc-allyl-Gly-OH (dicyclohexylammonium) salt; Boc-D-Chg-OH; Boc-Chg-OH; (R)—N-Boc-(2'-chlorophenyl)glycine; Boc-L-cyclopropylglycine; Boc-L-cyclophenylglycine; (R)—N-Boc-4-fluorophenylglycine; Boc-D-propargylglycine; Boc-(S)-3-thienylglycine; Boc-(R)-3-thienylglycine; D-a-Cyclohexylglycine; L-a-Cyclopropylglycine; N-(2-fluorophenyl)-N-(methylsulfonyl)glycine; N-(4-fluorophenyl)-N-(methylsulfonyl glycine; Fmoc-N-(2, 4-dimethoxybenzyl)-Gly-OH; N-(2-Furoyl)glycine; L-a-Neopentylglycine; D-Propargylglycine; sarcosine; Z-a-Phosphonoglycine trimethyl ester, and mixtures thereof.
5. The composition for use according to any of clauses 1 to 4, wherein the at least one N-acetylcysteine functional derivative is selected from the group consisting of N-({2-[(ethylsulfonyl)amino]ethyl}sulfonyl)-L-alanine, N-acetyl-S-(1Z)-propenyl-cysteine-sulfoxide, S-(5-acetamido-2-hydroxyphenyl)cysteine, S-2-chloroethylcysteine), D-cysteinederivative, L-cysteine derivative, cysteic acid, cysteinyl-aminoacid, cystine, gamma-glutamylcysteinylglutamate, grixazone B, hawkinsin, peptidyl-cysteine, prenylcysteine, S-acetamidomethylcysteine, glutathione (GSH) and glutathione forms (liposomal GSH).
6. The composition for use according to any of clauses 1 to 5, wherein the composition further comprises at least one compound selected from the group consisting of antioxidants, anti-inflammatory compounds, glycosaminoglycans, prebiotics, fibres, probiotics, fatty acids, enzymes, minerals, trace elements and/or vitamins.
7. The composition for use according to any of Clauses 1 to 6, wherein the composition is selected from the group consisting of food compositions, dietary supplements, nutritional compositions, oral nutritional supplement, medical food, nutraceuticals, beverages, powdered nutritional products to be reconstituted in water or milk before consumption, food additives, food for special medical purpose (FSMP) medicaments, drinks, pet food, and combinations thereof.
8. The composition for use according to any of clauses 1 to 7, wherein the composition is in a form of a solid powder, a powdered stick, a capsule or a solution.
9. The composition for use according to any preceding clauses wherein the composition is administered orally or enterally.
10 The composition according to any preceding clauses, wherein the individual has a liver disease, e.g. NAFLD, NASH, or a gastrointestinal condition such as intestinal inflammation, such as colitis ulcerosa, Crown's, mucositis and gut dysbiosis, for example. or is at risk of developing such condition.
11. The composition according to any preceding clauses, wherein the individual is critically ill.
12. A method of manufacturing a nutritional composition for use according to any of the preceding clauses, comprising the steps of providing one or more ingredients for a nutritional composition, at least one glycine or functional derivative thereof and/or at least one N-acetylcysteine or functional derivative thereof, and at least one thymol and/or carvacrol, and mixing.

It should be understood that various changes and modifications to the presently preferred embodiments described herein will be apparent to those skilled in the art. Such changes and modifications can be made without departing from the spirit and scope of the present subject matter and

The invention claimed is as follows:

1. A method for treating, preventing or managing nonalcoholic fatty liver disease (NAFLD), non-alcoholic steatohepatitis (NASH), hepatitis, hepatic steatosis (fatty liver) and/or associated liver damage in an individual in need thereof comprising administering to the individual a composition comprising an effective amount of a combination of at least one glycine or functional derivative thereof and/or at least one N-acetylcysteine or functional derivative thereof, and at least one thymol and/or carvacrol.

2. A method for preventing hepatotoxicity and/or liver damage comprising administering a composition comprising an effective amount of a combination of at least one glycine or functional derivative thereof and/or at least one N-acetylcysteine or functional derivative thereof, and at least one thymol and/or carvacrol to an individual in need of same.

3. The method according to claim 1, wherein the combination is in an amount effective to decrease hepatic triglycerides and/or circulating AST and ALT enzymes.

4. The method according to claim 1, wherein the at least one glycine or functional derivative thereof is selected from the group consisting of L-glycine, L-glycine ethyl ester, D-Allylglycine; N-[Bis(methylthio)methylene]glycine methyl ester; Boc-allyl-Gly-OH (dicyclohexylammonium) salt; Boc-D-Chg-OH; Boc-Chg-OH; (R)—N-Boc-(2'-chlorophenyl)glycine; Boc-L-cyclopropylglycine; Boc-L-cyclopropylglycine; (R)—N-Boc-4-fluorophenylglycine; Boc-D-propargylglycine; Boc-(S)-3-thienylglycine; Boc-(R)-3-thienylglycine; D-a-Cyclohexylglycine; L-a-Cyclopropylglycine; N-(2-fluorophenyl)-N-(methylsulfonyl)glycine; N-(4-fluorophenyl)-N-(methylsulfonyl glycine; Fmoc-N-(2,4-dimethoxybenzyl)-Gly-OH; N-(2-Furoyl)glycine; L-a-Neopentylglycine; D-Propargylglycine; sarcosine; Z-a-Phosphonoglycine trimethyl ester, and mixtures thereof.

5. The method according to claim 1, wherein the at least one N-acetylcysteine functional derivative is selected from the group consisting of N-({2-[(ethylsulfonyl)amino]ethyl}sulfonyl)-L-alanine, N-acetyl-S-(1Z)-propenyl-cysteine-sulfoxide, S-(5-acetamido-2-hydroxyphenyl)cysteine, S-2-chloroethylcysteine), D-cysteinederivative, L-cysteine derivative, cysteic acid, cysteinyl-aminoacid, cystine, gamma-glutamylcysteinylglutamate, grixazone B, hawkinsin, peptidyl-cysteine, prenylcysteine, S-acetamidomethyl-cysteine, glutathione (GSH) and glutathione forms (liposomal GSH).

6. The method according to claim 1, wherein the composition further comprises at least one compound selected from the group consisting of antioxidants, anti-inflammatory compounds, glycosaminoglycans, prebiotics, fibres, probiotics, fatty acids, enzymes, minerals, trace elements and/or vitamins.

7. The method according to claim 1, wherein the composition is in a form selected from the group consisting of food compositions, dietary supplements, nutritional compositions, oral nutritional supplement, medical food, nutraceuticals, beverages, powdered nutritional products to be reconstituted in water or milk before consumption, food additives, food for special medical purpose (FSMP) medicaments, drinks, petfood, and combinations thereof.

8. The method according to claim 1, wherein the composition is in a form selected from the group consisting of a solid powder, a powdered stick, a capsule and a solution.

9. The method according to claim 1, wherein the individual has a liver disease.

10. The method according to claim 1, wherein the individual is critically ill.

11. The method according to claim 2, wherein the combination is in an amount effective to decrease hepatic triglycerides and/or circulating AST and ALT enzymes.

12. The method according to claim 2, wherein the at least one glycine or functional derivative thereof is selected from the group consisting of L-glycine, L-glycine ethyl ester, D-Allylglycine; N-[Bis(methylthio)methylene]glycine methyl ester; Boc-allyl-Gly-OH (dicyclohexylammonium) salt; Boc-D-Chg-OH; Boc-Chg-OH; (R)—N-Boc-(2'-chlorophenyl)glycine; Boc-L-cyclopropylglycine; Boc-L-cyclopropylglycine; (R)—N-Boc-4-fluorophenylglycine; Boc-D-propargylglycine; Boc-(S)-3-thienylglycine; Boc-(R)-3-thienylglycine; D-a-Cyclohexylglycine; L-a-Cyclopropylglycine; N-(2-fluorophenyl)-N-(methylsulfonyl)glycine; N-(4-fluorophenyl)-N-(methylsulfonyl glycine; Fmoc-N-(2,4-dimethoxybenzyl)-Gly-OH; N-(2-Furoyl)glycine; L-a-Neopentylglycine; D-Propargylglycine; sarcosine; Z-a-Phosphonoglycine trimethyl ester, and mixtures thereof.

13. The method according to claim 2, wherein the at least one N-acetylcysteine functional derivative is selected from the group consisting of N-({2-[(ethylsulfonyl)amino]ethyl}sulfonyl)-L-alanine, N-acetyl-S-(1Z)-propenyl-cysteine-sulfoxide, S-(5-acetamido-2-hydroxyphenyl)cysteine, S-2-chloroethylcysteine), D-cysteinederivative, L-cysteine derivative, cysteic acid, cysteinyl-aminoacid, cystine, gamma-glutamylcysteinylglutamate, grixazone B, hawkinsin, peptidyl-cysteine, prenylcysteine, S-acetamidomethyl-cysteine, glutathione (GSH) and glutathione forms (liposomal GSH).

14. The method according to claim 2, wherein the composition further comprises at least one compound selected from the group consisting of antioxidants, anti-inflammatory compounds, glycosaminoglycans, prebiotics, fibres, probiotics, fatty acids, enzymes, minerals, trace elements and/or vitamins.

15. The method according to claim 2, wherein the composition is in a form selected from the group consisting of food compositions, dietary supplements, nutritional compositions, oral nutritional supplement, medical food, nutraceuticals, beverages, powdered nutritional products to be reconstituted in water or milk before consumption, food additives, food for special medical purpose (FSMP) medicaments, drinks, petfood, and combinations thereof.

16. The method according to claim 2, wherein the composition is in a form selected from the group consisting of a solid powder, a powdered stick, a capsule and a solution.

* * * * *